US011020858B2

(12) United States Patent
Amacker et al.

(10) Patent No.: US 11,020,858 B2
(45) Date of Patent: Jun. 1, 2021

(54) LIFTING ROBOT SYSTEMS

(71) Applicant: Toyota Research Institute, Inc., Los Altos, CA (US)

(72) Inventors: Matthew Amacker, Santa Clara, CA (US); Jonathan Yao, San Jose, CA (US); Manuel Ahumada, San Jose, CA (US); Andrew Custer, Oakland, CA (US)

(73) Assignee: TOYOTA RESEARCHING INSTITUTE, INC., Los Altos, CA (US)

( * ) Notice: Subject to any disclaimer, the term of this patent is extended or adjusted under 35 U.S.C. 154(b) by 282 days.

(21) Appl. No.: 16/109,895

(22) Filed: Aug. 23, 2018

(65) Prior Publication Data

US 2020/0061838 A1 Feb. 27, 2020

(51) Int. Cl.
| | |
|---|---|
| *B25J 9/16* | (2006.01) |
| *B25J 11/00* | (2006.01) |
| *B25J 13/06* | (2006.01) |
| *G06F 3/01* | (2006.01) |
| *G06F 3/16* | (2006.01) |

(52) U.S. Cl.
CPC .......... *B25J 9/1697* (2013.01); *B25J 9/1664* (2013.01); *B25J 11/008* (2013.01); *B25J 13/06* (2013.01); *G06F 3/017* (2013.01); *G06F 3/167* (2013.01)

(58) Field of Classification Search
None
See application file for complete search history.

(56) References Cited

U.S. PATENT DOCUMENTS

| | | | | | |
|---|---|---|---|---|---|
| 4,283,165 | A | * | 8/1981 | Vertut | B25J 5/007 280/771 |
| 5,684,531 | A | * | 11/1997 | Li | G01C 3/085 348/139 |
| 6,374,158 | B1 | * | 4/2002 | Fusaro, Jr. | B23K 10/027 700/254 |
| 7,836,811 | B1 | * | 11/2010 | Gardner | F41A 23/28 102/402 |
| 8,060,344 | B2 | * | 11/2011 | Stathis | G01C 15/002 348/135 |
| 8,155,787 | B2 | * | 4/2012 | Chalubert | B25J 9/1671 700/245 |
| 8,781,629 | B2 | * | 7/2014 | Ota | B25J 9/1664 318/568.12 |

(Continued)

OTHER PUBLICATIONS

Georgia Institute of Technology. "Robot Fetches Objects With Just a Point and a Click." ScienceDaily. ScienceDaily, Mar. 20, 2008. <www.sciencedaily.com/releases/2008/03/080319160057.htm>.

(Continued)

*Primary Examiner* — Bhavesh V Amin
(74) *Attorney, Agent, or Firm* — Dinsmore & Shohl LLP

(57) ABSTRACT

Lifting robot systems and methods for operating the same are disclosed. A lifting robot system includes a sensor device and a robot device. The robot device includes a body, a lifting component movably coupled to the body, and a collection tray coupled to the lifting component. Upon receiving a command to lift an object, the sensor device automatically detects the object, the robot device places the object on the collection tray, and the robot device causes the lifting component to lift the collection tray from a first height to a second height.

20 Claims, 10 Drawing Sheets

(56) References Cited

U.S. PATENT DOCUMENTS

| | | | | |
|---|---|---|---|---|
| 9,827,678 | B1* | 11/2017 | Gilbertson | A47L 11/24 |
| 2007/0239315 | A1* | 10/2007 | Sato | B25J 9/1612 |
| | | | | 700/245 |
| 2008/0046221 | A1* | 2/2008 | Stathis | G01C 15/002 |
| | | | | 703/1 |
| 2010/0172733 | A1* | 7/2010 | Chalubert | B25J 9/1671 |
| | | | | 414/730 |
| 2010/0243344 | A1* | 9/2010 | Wyrobek | B25J 19/0016 |
| | | | | 180/21 |
| 2011/0238205 | A1* | 9/2011 | Kemp | B66F 9/07581 |
| | | | | 700/214 |
| 2012/0029870 | A1* | 2/2012 | Stathis | G01C 15/002 |
| | | | | 702/155 |
| 2012/0072023 | A1* | 3/2012 | Ota | B25J 9/1671 |
| | | | | 700/259 |
| 2012/0152877 | A1* | 6/2012 | Tadayon | B25J 5/00 |
| | | | | 212/224 |
| 2013/0046438 | A1* | 2/2013 | Summer | A61G 5/1094 |
| | | | | 701/36 |
| 2014/0214196 | A1* | 7/2014 | Worsley | G05D 1/0291 |
| | | | | 700/217 |
| 2017/0095382 | A1* | 4/2017 | Wen | G16H 40/67 |
| 2017/0136621 | A1* | 5/2017 | Benaim | G06F 3/013 |

OTHER PUBLICATIONS

Toyota Motor Corporation. "Partner Robot Family". Jan. 30, 2018. <http://www.toyota-global.com/innovation/partner_robot/family_2.html>.

University of Alberta. "VIBI: Assistive Vision-Based Interface for Robot Manipulation". Jan. 30, 2018. <https://webdocs.cs.ualberta.ca/~vis/HRI/>.

* cited by examiner

LIFTING ROBOT SYSTEMS

BACKGROUND

Field

The present specification generally relates to assistive robot systems and, more particularly, to robot systems that lift objects off a ground surface to a level that is reachable by a user.

Technical Background

Currently, certain people may struggle with retrieving items. For example, people such as elderly or reduced mobility people may struggle with the movements necessary to pick items off a ground/floor surface, such as, for example, items that have been dropped.

Existing devices and robot systems may include arms with an actuator such as a gripper or the like that are manually operated by a user to retrieve an item. However, such devices and robot systems are not autonomous and may still present difficulties to the user in lifting the item off of the ground/floor surface.

SUMMARY

In one embodiment, a lifting robot system includes a sensor device and a robot device. The robot device includes a body, a lifting component movably coupled to the body, and a collection tray coupled to the lifting component. Upon receiving a command to lift an object, the sensor device automatically detects the object, the robot device places the object on the collection tray, and the robot device causes the lifting component to lift the collection tray from a first height to a second height.

In another embodiment, a lifting robot system includes a first unit and a second unit separate from the first unit. The first unit includes a body, a base supporting the body, the base having one or more mobility components, and a plow component coupled to the body such that the plow component contacts a ground surface. The second unit includes a lifting pad and a lifting component coupled to the lifting pad. The lifting component is movable to lift the lifting pad from the ground surface to a height.

In yet another embodiment, a lifting robot system includes a sensor device, a user interface device, and a robot device. The robot device includes a body, a lifting component movably coupled to the body, a collection tray coupled to the lifting component, a processing device communicatively coupled to the sensor device, the user interface device, and the lifting component, and a non-transitory, processor-readable storage medium communicatively coupled to the processing device. The non-transitory, processor-readable storage medium includes one or more programming instructions that, when executed, cause the processing device to receive a signal or data from the user interface device, the signal or the data corresponding to a request from a user to retrieve an object, receive sensor data from the sensor device, where the sensor data corresponds to a sensed environment around the lifting robot system and includes the object and an indicator indicating the object, determine a location of the object, direct movement of the robot device to the object such that the object is placed on the collection tray, and cause the lifting component to raise the collection tray and the object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

The present disclosure relates generally to robot systems that assist a user in retrieving target objects from a surface that is lower than the user is able to easily access (e.g., a ground or floor surface). The robot systems are particularly useful for users that struggle with picking up target objects off the ground or floor on their own, such as, for example, elderly individuals or individuals with reduced mobility. The robot systems described herein generally include components for collecting the target object from a relatively lower height (e.g., the floor or ground surface) and elevating the target object to a relatively higher height (e.g., a height that is more easily reachable by a user). In some embodiments, the robot systems described herein may further deliver the target object to the user. In some embodiments, the robot systems described herein may further include an identifying device that is held by a user and used to indicate the target object to be lifted off the floor or ground.

The heights described herein are non-limiting, and may vary based on the abilities of a user, the height of a user, the location of a target object, and/or the like. As such, it should be understood that a "user reachable height," a "height that is accessible to a person," or other similar term refers to a height that a particular user can access based on that user's abilities and body height. For example, a user that is wheelchair bound may have a user reachable height that generally corresponds to the height of the user's arms and hands when sitting in the wheelchair.

Figure 1A:
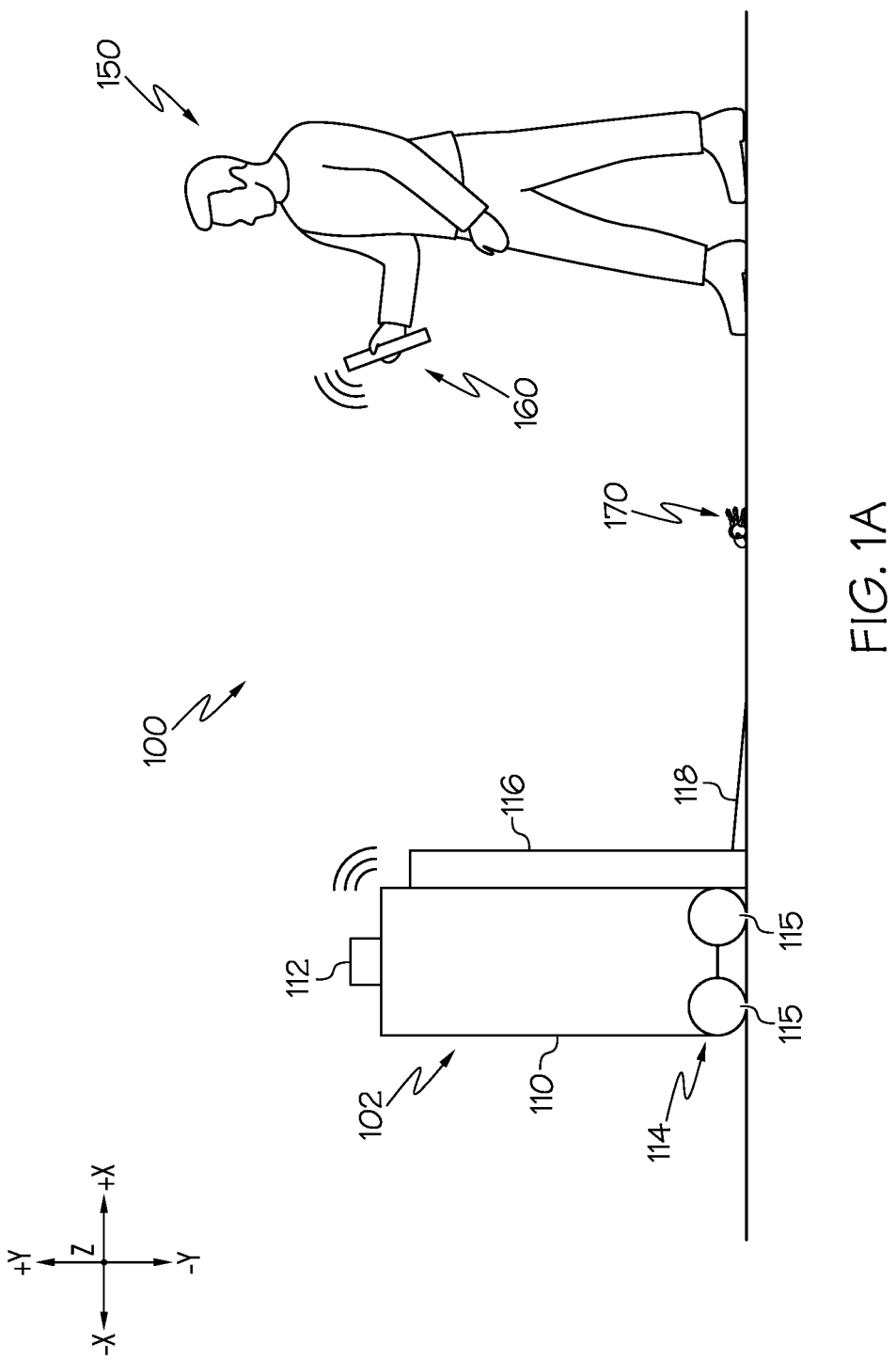
FIG. 1A schematically depicts a side view of an illustrative lifting robot system interacting with a user according to one or more embodiments shown and described herein.
Figure 1B:
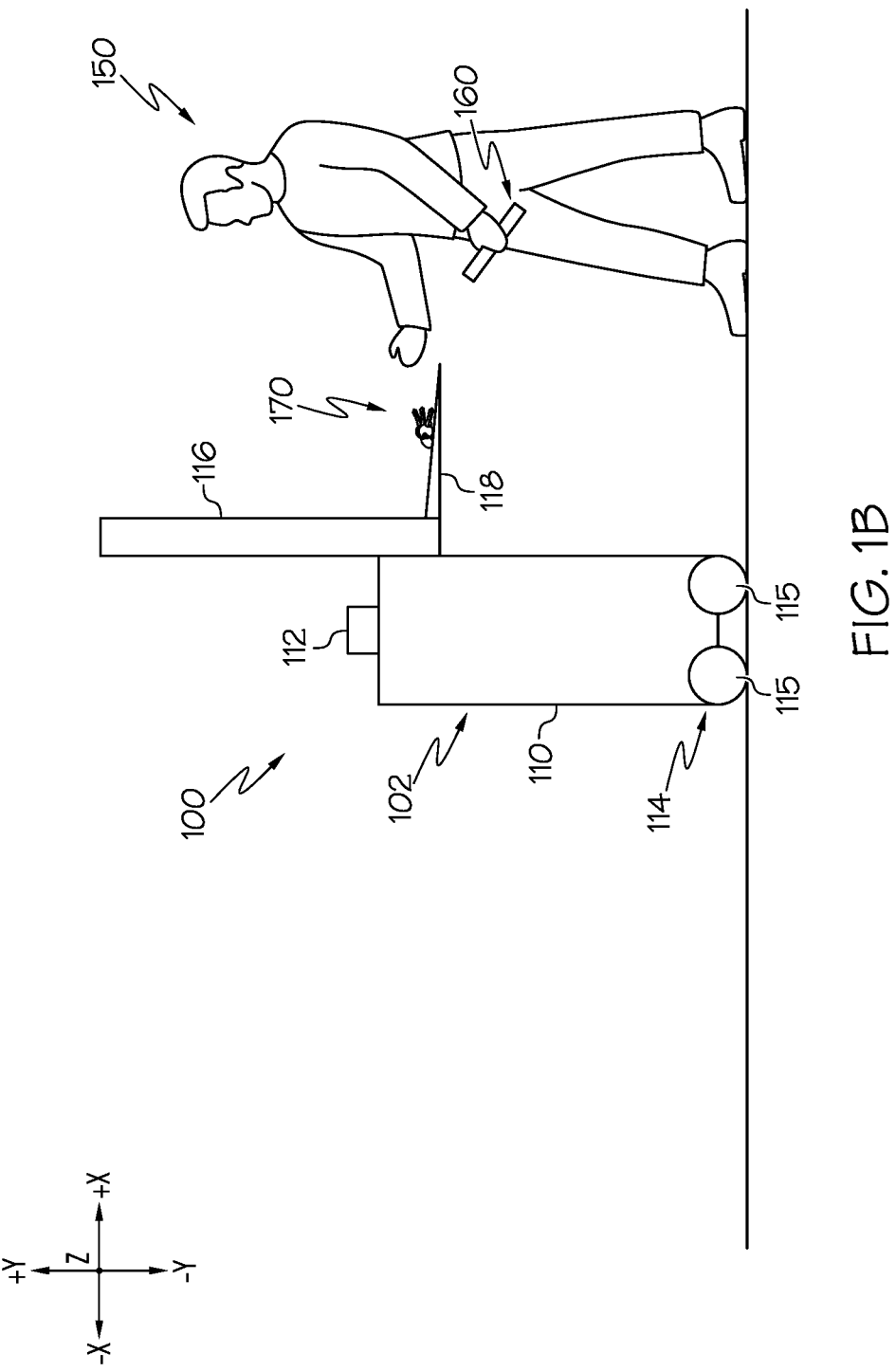
FIG. 1B schematically depicts a side view of an illustrative lifting robot system delivering an object to a user according to one or more embodiments shown and described herein.

Referring now to the drawings, FIGS. 1A-1B depict an illustrative lifting robot system, generally designated 100, according to various embodiments. The illustrative lifting robot system 100 depicted in FIGS. 1A-1B may provide particular use in assisting people, particularly those who are elderly and/or have reduced mobility (referred to herein as users 150), with picking a target object 170 up from a first height (e.g., a ground or floor surface, as shown in FIG. 1A) and raising the target object 170 to a second height (e.g., a height that is accessible to a person, as shown in FIG. 1B), as described in further detail herein. It should be appreciated that the lifting robot system 100 is not limited to this use and may be used for other purposes without departing from the scope of the present disclosure. For example, the lifting robot system 100 may be used to deliver target objects 170 from a user 150 to a target location (e.g., raise or lower target objects collected from a user). In some embodiments, the lifting robot system 100 may be used in other fields, such as, for example, in healthcare, in manufacturing, in vehicle repair, and/or the like.

The lifting robot system 100 generally includes a robot device 102 communicatively coupled to a user interface device 160. The robot device 102 includes a body 110 supported on a base 114. In some embodiments, the body 110 may have a plurality of surfaces. The various surfaces may support one or more components of the lifting robot system 100, as described in further detail herein.

Still referring to FIGS. 1A-1B, the base 114 of the robot device 102 may be coupled to (or may include) one or more mobility components, such as, for example, one or more wheels 115 rotatably coupled to the base 114. In some embodiments, at least one of the one or more wheels 115 may be coupled to a drive mechanism such as a motor, a transmission, and/or the like such that the wheels 115 can be rotated to move the robot device 102 across a surface, as described in greater detail herein. In some embodiments, at least one of the wheels 115 may be movable around a plurality of axes such that the wheel is steerable. The wheels 115 are otherwise not limited by the present disclosure and may contain any other features. For example, the wheels 115 may be adapted for moving over varied and/or unpaved terrain, adapted for navigating the robot device 102 over floor obstacles (such as a single step, a threshold, or the like), adapted to move in inclement weather conditions, and/or the like. While FIGS. 1A-1B depict the wheels 115 as the mobility components, it should be appreciated that the present disclosure is not limited to such. For example, the mobility components may be skis, rotors, and/or the like that provide the robot device 102 with an ability to move.

In various embodiments, the robot device 102 may include a lifting component 116 coupled to the body 110 (e.g., coupled to a surface of the body 110). In some embodiments, the lifting component 116 may be movably coupled to the body 110 such that the lifting component 116 can move in a system vertical direction (e.g., along the +y/−y axis of the coordinate axes of FIGS. 1A-1B), as described in greater detail herein. However, it should be understood that in some embodiments, the lifting component 116 may be movably coupled to the body 110 in other manners so as to facilitate tilting of the lifting component 116 or the like. The lifting component 116 may support a collection tray 118, which is described in greater detail herein with respect to FIG. 2. Still referring to FIGS. 1A-1B, the lifting component 116 may generally function to raise, lower, or tilt the collection tray 118 between a first height and a second height. For example, the lifting component 116 may raise or lower the collection tray 118 between a ground or floor surface (as shown in FIG. 1A) to a height above the ground or floor surface (as shown in FIG. 1B). It should be understood that the ground or floor surface and the height to which the collection tray 118 is lifted in FIG. 1B are merely illustrative, and the lifting component 116 can also move the collection tray 118 between other heights not specifically described herein. The lifting component 116 may include a mechanism that adjusts the height of the lifting component 116 and the collection tray 118 coupled thereto with respect to the remainder of the robot device 102. Such a mechanism generally provides the robot device 102 with an ability to lift objects from a first height (e.g., the ground or floor surface) to a second height that is higher than the first height (e.g., above the first height in the +y direction of the coordinate axes of FIG. 1A).

As depicted in FIGS. 1A and 1B, the lifting component 116 may automatically drive the collection tray 118 in an upwards or downwards motion in a system vertical direction (e.g., in the +y/−y direction of the coordinate axes of FIGS. 1A and 1B) to lift the collection tray 118 off the ground surface or place the collection tray 118 on the ground surface. In addition, the lifting component 116 may further be any device or mechanism that is capable of supporting the weight of the collection tray 118 and any item held thereon. Accordingly, the lifting component 116 may include, but is not limited to, a chain drive mechanism, a belt drive mechanism, a hydraulic lift, a pneumatic lift, a linear drive motor, a lead screw, a plurality of mechanical linkages (e.g., a scissor lift mechanism), a ribbon lift (i.e., a zip lift), a spiral lift, and/or the like. Other means of driving the movement of the lifting component 116 as described herein are contemplated and included within the scope of the present disclosure.

The robot device 102 may include various components that allow the robot device 102 to have autonomous movement and/or semi-autonomous movement capabilities that allow the robot device 102 to move around a space with little or no input from a user 150 (e.g., via the user interface device 160). That is, the robot device 102 may include components such as autonomous drive systems, autonomous sensing devices, and/or the like.

For example, the robot device 102 may include a sensor device 112 mounted thereto, as shown in FIGS. 1A and 1B. The sensor device 112 may include various components for sensing an environment around the lifting robot system 100 for the purposes of autonomous movement of the lifting robot system 100, semi-autonomous movement of the lifting robot system 100, and/or the like. The various components of the sensor array 112 are not limited by the present disclosure, and may generally be any components that provide the functionality described herein. For example, the sensor device 112 may include one or more imaging devices, cameras, optical sensors, ranging systems, time-of-flight (TOF) sensors, proximity sensing systems, laser emitting devices, microphones, ultrasonic signal receivers, and/or the like. Such systems should generally be understood and are not described further herein.

In some embodiments, the sensor device 112 may be particularly configured to sense an area adjacent to the robot device 102 and provide data corresponding to the area adjacent to the robot device 102. The data may then be used to guide the robot device 102 around a space in an appropriate manner, locate the target object 170 to be lifted, lift the target object 170, navigate to or from one or more other objects (e.g., the user 150), and/or the like, as described in greater detail herein. The area adjacent to the robot device 102 may be, for example, a room in which the robot device 102 is located, a particular geofenced area that has been defined for the robot device 102, and/or the like.

Referring again to FIG. 1A, the user interface device 160 may be held by the user 150 and used to provide an indicator of the target object 170 to be lifted and/or to receive one or more user inputs, as described in greater detail herein. For example, as shown in FIG. 1A, the user interface device 160 may be portable such that it can be held in a hand of the user 150, carried in a pocket of the user 150, and/or the like. However, it should be understood that such a location is merely illustrative and the user interface device 160 may be located elsewhere. For example, the user interface device 160 may be coupled to the robot device 102, mounted to a wall, resting on a surface (e.g., a tabletop), or the like without departing from the scope of the present disclosure. The user interface device 160 may generally provide one or more user-facing functions, including, but not limited to, providing the user 150 with controls for indicating the target object 170 to be lifted (as described in greater detail herein), providing the user 150 with controls for controlling movement of the robot device 102, providing the user 150 with controls for controlling settings of the lifting robot system 100, providing the user 150 with controls for docking the robot device 102 to a charging station, providing the user 150 with controls for directing the lifting component 116 to move up or down, and/or the like. It should be understood that the user interface device 160 may provide other functionality not specifically described herein without departing from the scope of the present disclosure.

In some embodiments, the user interface device 160 may include one or more user input components, including, but not limited to, one or more buttons, one or more microphones, one or more motion sensors (e.g., gyro sensors or the like), one or more imaging devices, and/or the like. Such components may generally be used to receive one or more inputs from the user 150 in the form of a button press, a voiced command, a movement or gesture while holding the user interface device 160, a gesture that is imaged by the user interface device 160, and/or the like. In some embodiments, the user interface device 160 may include one or more light emitting components that emit an indicator, as described in greater detail herein.

In some embodiments, the user interface device 160 may have particular components that provide functionality for uses other than locating the target object 170. For example, the user interface device 160 may have components (e.g., joystick components) that allow the user 150 to manually control movement of the robot device 102 and/or a component thereof. As such, the user 150 may manually drive the robot device 102 to the target object 170 and/or direct collection and hoisting of the target object 170 by manipulating a component of the user interface device 160, as described herein.

In embodiments where the user interface device 160 is not physically coupled to the body 110 of the robot device 102, the user interface device 160 may be communicatively coupled to the robot device 102 such that one or more signals can be transmitted. That is, the user interface device 160 may be communicatively coupled to various components of the robot device 102 via a wireless connection, such as, for example, a Bluetooth connection, a wi-fi connection, a mesh network connection (e.g., a Zigbee connection, a Z-wave connection, and/or the like), a near field communication (NFC) connection, and/or the like. As such, the user interface device 160 and the various components of the robot device 102 may each have hardware components that allow for such a wireless coupling. Additional details regarding such components are described in greater detail herein.

In some embodiments, the user interface device 160 may include one or more components for indicating a location of the target object 170 such that the robot device 102 can navigate and/or move with respect to the target object 170, collect the target object 170, lift the target object 170, navigate and/or move relative to the user 150 so as to deliver the target object 170 to the user 150, and/or the like. For example, the user interface device 160 may have a light emitting component that emits a beam of light (e.g., a laser beam) that is aimed by the user 150 at the target object 170 in some embodiments. The light emitted by the light emitting component of the user interface device 160 may project a dot on or near the target object 170, a shape around the target object 170, or otherwise provide a projection onto or near the target object 170 that is detected by the sensor device 112 and used to generate data relating to the location of the robot device 102 (particularly the body 110 thereof) relative to the target object 170 such that the robot device 102 can move relative to the target object 170. The projection may also be adjusted for size and/or shape by the user interface device 160 to correspond to the size and shape of the target object 170 such that a size of the target object 170 can be determined for the purposes of determining whether the target object 170 is small enough to be collected and hoisted by the robot device 102. The user 150 may also manipulate the user interface device 160 to draw a box around the target object 170, which is then used for size estimation and determination of whether the target object 170 can be collected and hoisted. In another example, the user interface device 160 may be used to determine the location of the target object 170 relative to the user interface device 160 and/or the body 110 (e.g., via imaging an area for the target object 170, using sound waves to detect the target object 170, using time of flight lasers to detect the target object 170, and/or the like), generate data corresponding to the location, and provide instructions for moving the body 110 relative to the target object 170.

In some embodiments, the user interface device 160 may include an imaging device that is used to capture an image of the target object 170. The user interface device 160 may then transmit image data to the robot device 102, which uses the image data to assist in locating the target object 170, determining a size of the target object 170, determining a location of the target object 170, and/or the like.

In some embodiments, the location of the user interface device 160 may be used by the robot device 102 to determine the location of the target object 170. That is, the user interface device 160 may be placed or held by the user 150 in the vicinity of the target object 150, and communications between the user interface device 160 and the robot device 102 may be used to determine the location of the user interface device 160 and the target object 170. For example, the user interface device 160 may emit ultrasonic transmissions that are detected by two receivers spaced apart on the robot device 102 (e.g., two receivers within the sensor device 112), whereby the distance between the receivers and the characteristics of the ultrasonic transmissions are used to triangulate the location of the user interface device 160. In another example, the user interface device 160 and/or the robot device 102 may utilize ultra-wideband radio emitters and/or receivers to determine the location of the user interface device 160. In yet another example, the robot device 102 may utilize time-of-flight sensors to sense the location of the user interface device 160, as described herein.

It should be understood that in some embodiments, the user interface device 160 may not be used for indicating a location of the target object 170. That is, the user interface device 160 may receive an input from the user 150 via another means, and utilize that input to determine the location of the target object 170 or provide data relating to the user's indication. For example, the user 150 may gesture toward the target object 170 (e.g., point at the target object 170). The user interface device 160, the sensor device 112, and/or other components of the lifting robot system 100 may then be used to determine the gesture provided by the user 150, determine the target object 170 based on the gesture (e.g., image an area where the user 150 is pointing, etc.), and determine movement or navigation instructions for navigating to the target object 170. In another example, the user 150 may provide an input (e.g., a voiced input via a microphone, a text based input via a keyboard, a joystick input, or the like) that is used to determine the location of the target object 170. For example, the user 150 may say "pick up the keys," "get me the remote from the coffee table," or a similar phrase, and the user interface device 160 may sense the input, utilize voice recognition software to recognize the phrase, determine what the target object 170 is based on the recognized phrase, determine the location of the target object 170 (e.g., by determining a location uttered by the user 150, utilizing the sensor device 112 to locate the target object 170, and/or the like), and navigate to the target object 170. Other means of determining where the user 150 is indicating, recognizing the target object 170, and navigating to the target object 170 and/or the user 150 are also contemplated and included within the scope of the present disclosure.

In some embodiments, the user interface device 160 may be integrated with a third party hardware device and/or software (e.g., via an application programming interface (API) or the like) to interface with the user 150 for the purposes of directing the lifting robot system 100. For example, "smart home" devices such as cameras, microphones, motion sensors, and/or the like that are communicatively coupled to a user's home network may provide data relating to commands received from the user 150, sensed gestures, the location of the target object 170, the location of the robot device 102 (or a component thereof) relative to the target object 170, and/or the like. In a nonlimiting example, the user 150 may utilize a third party user interface device that incorporates an electronic personal assistant (e.g., Google Assistant (Alphabet, Inc., Mountain View, Calif.), Amazon Alexa® (Amazon.com, Seattle, Wash.), Siri® (Apple, Cupertino, Calif.), Cortana® (Microsoft Corporation, Redmond, Wash.), or the like) to direct the robot device 102 to pick up the target object 170 (e.g., by voicing a command to the user interface device 160 and/or by gesturing toward the target object 170). In some embodiments, the user interface device 160 may be a user's personal mobile device, such as a smartphone or the like, and/or may be coupled to a user's personal mobile device (e.g., as a hardware attachment that is added to the mobile device).

Figure 2:
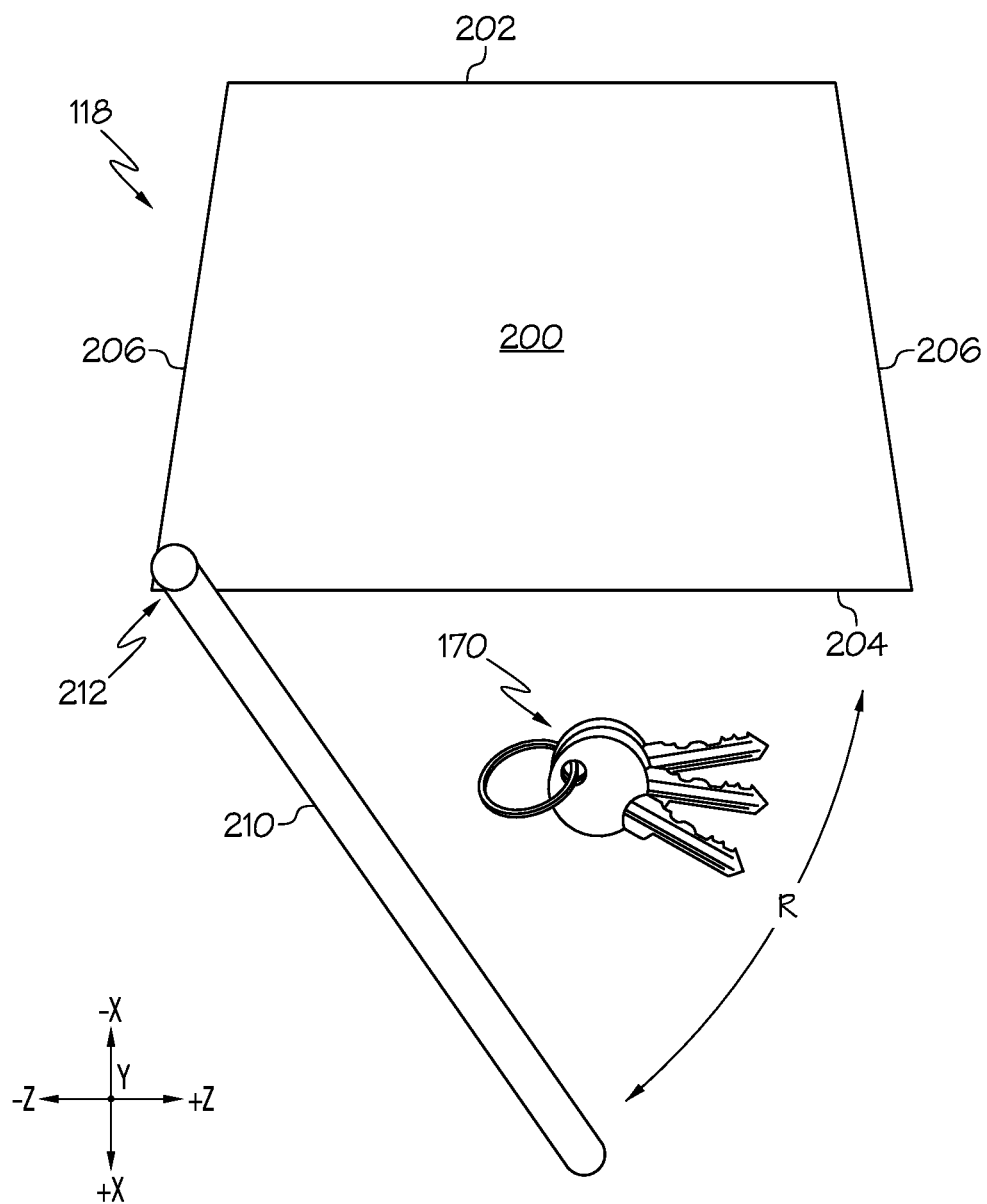
FIG. 2 schematically depicts a top view of an illustrative collection of a lifting robot system according to one or more embodiments shown and described herein.

The collection tray 118 of the robot device 102 may generally be used to collect the target object 170 therein such that the robot device 102 can transport the target object 170, lift the target object 170, provide the target object 170 to the user 150, and/or the like. Additional details regarding the collection tray 118 are depicted in FIG. 2. More specifically, FIG. 2 schematically depicts a top view of the collection tray 118, which includes a tray body 200 hingedly coupled to a collection arm 210 via a hinge 212.

The tray body 200 may generally be a body having a surface that is shaped and sized to receive the target object 170 therein when the target object 170 is pushed into the tray body 200. As such, one or more edges of the tray body 200 may include sidewalls that extend or protrude from the surface to prevent the target object 170 from falling off of the tray body 200. For example, a rear edge 202 of the tray body 200 and one or more side edges 206 of the tray body 200 may have sidewalls that extend or protrude in a substantially system vertical direction (e.g., along the y axis of the coordinate axes of FIG. 2). The tray body 200 may also include a front edge 204 that is shaped and/or sized to allow the target object 170 to be pushed onto the surface of the tray body 200 and retained on the tray body 200 until retrieved by the user 150 (FIG. 1A). That is, the front edge 204 may be beveled or sloping such that the target object 170 can be pushed by the collection arm 210 onto the tray body 200, as indicated by the arrow in FIG. 2. It should be understood that the shapes, sizes, and characteristics of the various components of the tray body 200 may be similar to that of a dustpan. Other features and/or characteristics of the tray body 200 are not limited by the present disclosure.

The collection arm 210 may generally be a robotic arm hingedly coupled to the tray body 200 via the hinge 212 such that the collection arm 210 rotates about the hinge 212 relative to the tray body 200. For example, the collection arm 210 may rotate towards or away from the tray body 200 in a rotational direction R about the hinge 212. Rotational movement of the collection arm 210 away from the tray body 200 (e.g., in a clockwise motion as shown in FIG. 2) may open the front edge 204 of the tray body 200 to the target object 170 and/or other objects. In addition, rotational movement of the collection arm 210 towards the tray body 200 (e.g., in a counterclockwise motion as shown in FIG. 2) may push any objects (including the target object 170) towards the tray body 200 when objects are located therebetween. As such, the collection arm 210 acts as a sweeping arm to push objects onto the tray body 200.

In some embodiments, the collection arm 210 is coupled to an actuator (not shown) that provides the rotational movement of the collection arm 210 about the hinge 212. The actuator is not limited by this disclosure, and may generally be any actuator that provides a force to effect rotational movement of the collection arm 210. One nonlimiting example of an actuator that may provide such rotational movement of the collection arm 210 is a rotary actuator. However, other actuators and other means of causing the collection arm 210 to rotate about the hinge 212 relative to the tray body 200 should generally be understood to be included within the scope of the present disclosure.

In some embodiments, the collection arm 210 may have one or more joints that allow portions of the collection arm 210 to articulate with respect to other portions. In such embodiments, the joints of the collection arm 210 may allow the collection arm to push a plurality of different shaped and sized target objects 170 onto the tray body 210 and may also allow the collection arm 210 to access a target object 170 that is located near an obstruction. For example, if the target object 170 is located in a corner, the jointed collection arm 210 can bend (via the joints) around the target object 170 without being obstructed by the walls of the corner.

It should be understood that the collection arm 210 described herein is merely illustrative, and other components may also be used without departing from the scope of the present disclosure. For example, the collection arm 210 may include an end effector or the like that can manipulate the target object 170 for placement onto the tray body 200.

Figure 3A:
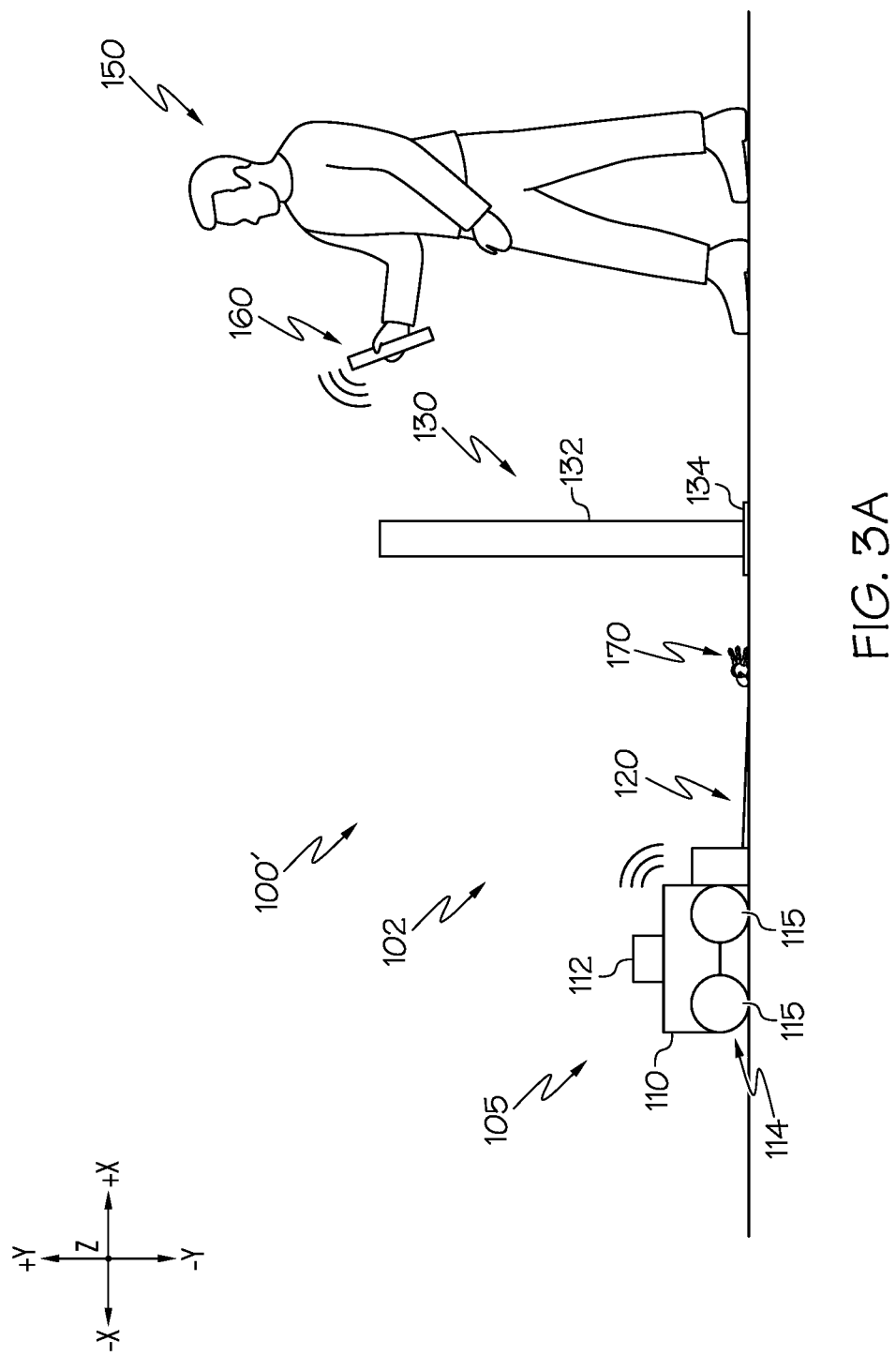
FIG. 3A schematically depicts a side view of another illustrative lifting robot system according to one or more embodiments shown and described herein.
Figure 3B:
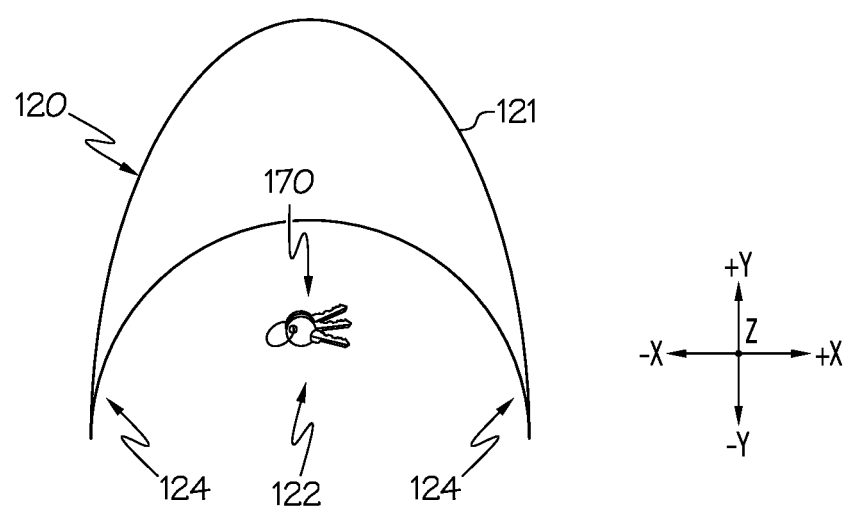
FIG. 3B schematically depicts a top view of an illustrative collection plow of another lifting robot system according to one or more embodiments shown and described herein.

In some embodiments, the target object 170 may be collected and/or moved by one component and lifted by another, separate component instead of using the same component for collecting, moving, and lifting as described with respect to FIGS. 1A-1B and 2. For example, as depicted in FIGS. 3A and 3B, an alternative lifting robot system 100' may include a first unit 105 and a second unit 130 that is separate from the first unit 105. The first unit 105 may generally contain components for locating the target object 170 and/or moving the target object 170 about the ground or floor surface. For example, the first unit 105 may include the body 110 supported on the base 114 having mobility components such as wheels 115, as described in greater detail herein. In addition, the first unit 105 may also include the sensor device 112, as described in greater detail herein.

In various embodiments, the first unit 105 may further include a plow component 120 that is used to contact the target object 170 and push the target object 170 to a particular location (e.g., towards the second unit 130). The plow component 120 may generally be coupled to the body 110 of the first unit 105 such that the plow component 120 contacts a ground surface upon which the first unit 105 is located and, when the first unit 105 moves, the plow component 120 scrapes the surface to push items around the surface, as described in greater detail herein.

Referring particularly to FIG. 3B, the plow component 120 may be shaped, sized, and/or configured to push the target object 170 around a space towards the second unit 130 (FIG. 3A). Still referring to FIG. 3B, the plow component 120 may have a body 121 having one or more extensions 124 that define a recess 122 in some embodiments. As such, as the first unit 105 (FIG. 3A) moves around a space relative to the target object 170, the target object 170 is received within the recess 122 of the plow component 120 and is pushed around the ground or floor surface. In some embodiments, the extensions 124 may extend from the body 121 such that the target object 170, when pushed around by the plow component 120, is prevented from slipping away from contact with the body 121 by the extensions 124, particularly in instances where the first unit 105 (FIG. 3A) changes directions when moving. It should be understood that the plow component 120 shown in FIGS. 3A-3B is merely illustrative, and other components that provide a similar functionality of pushing the target object 170 is also contemplated and included within the scope of the present disclosure.

Referring again to FIG. 3A, the second unit 130, which may also be referred to as an elevator, lift, dumbwaiter, or the like, may generally contain components for lifting the target object 170 once the target object 170 has been delivered from the first unit 105 to the second unit 130. More specifically, the second unit 130 may include a lifting component 132 coupled to a lifting pad 134. The second unit 130 may be mounted to a wall or the like in an area that is accessible to the user 150. The second unit 130 is generally stationary (i.e., does not move around a room like the first unit 105) and only functions to raise and lower the lifting pad 134, as described herein.

Still referring to FIG. 3A, the lifting component 132 may generally function to raise or lower the lifting pad 134 between a first height and a second height. For example, the lifting component 132 may raise or lower the lifting pad 134 between a ground or floor surface to a particular height (e.g., a height that is accessible to the user 150). It should be understood that the ground or floor surface and the particular height are merely illustrative, and the lifting component 132 can also move the lifting pad 134 between other heights not specifically described herein. The lifting component 132 may include a mechanism that adjusts the height of the lifting component 132 and the lifting pad 134 coupled thereto. Such a mechanism generally provides the second unit 130 with an ability to lift objects off the ground or floor surface.

As depicted in FIG. 3A, the lifting component 132 may automatically drive the lifting pad 134 in an upwards or downwards motion in a system vertical direction (i.e., along the y axis of the coordinate axes of FIG. 3A) to lift the lifting pad 134 off the ground surface or place the lifting pad 134 on the ground surface. In addition, the lifting component 132 may further be any device or mechanism that is capable of supporting the weight of the lifting pad 134 and any item held thereon. Accordingly, the lifting component 132 may include, but is not limited to, a chain drive mechanism, a belt drive mechanism, a hydraulic lift, a pneumatic lift, a linear drive motor, a lead screw, a plurality of mechanical linkages (e.g., a scissor lift mechanism), a ribbon lift (i.e., a zip lift), a spiral lift, and/or the like. Other means of driving the movement of the lifting component 132 as described herein are contemplated and included within the scope of the present disclosure.

The lifting pad 134 is generally not limited by this disclosure, and may be any surface that supports an object when placed thereon such that the lifting component 132 can lift the lifting pad 134. In some embodiments, the lifting pad 134 may be coupled to one or more sensors, such as imaging devices, pressure sensors, and/or the like that are used to determine whether an object is located on the lifting pad 134, as described in greater detail herein.

The robot device 102 (FIGS. 1A-1B) and the first unit 105 and second unit 130 (FIG. 3A) may have a non-transitory, processor-readable storage medium containing one or more programming instructions for completing the various processes described herein, which may be embodied as hardware, software, and/or firmware, according to embodiments shown and described herein. While in some embodiments the various components of the robot device 102, the first unit 105, and the second unit 130 may be configured as a general purpose computer with the requisite hardware, software, and/or firmware, in other embodiments, the various components of the robot device 102, the first unit 105, and the second unit 130 may also be configured as a special purpose computer designed specifically for performing the functionality described herein.

Figure 4:
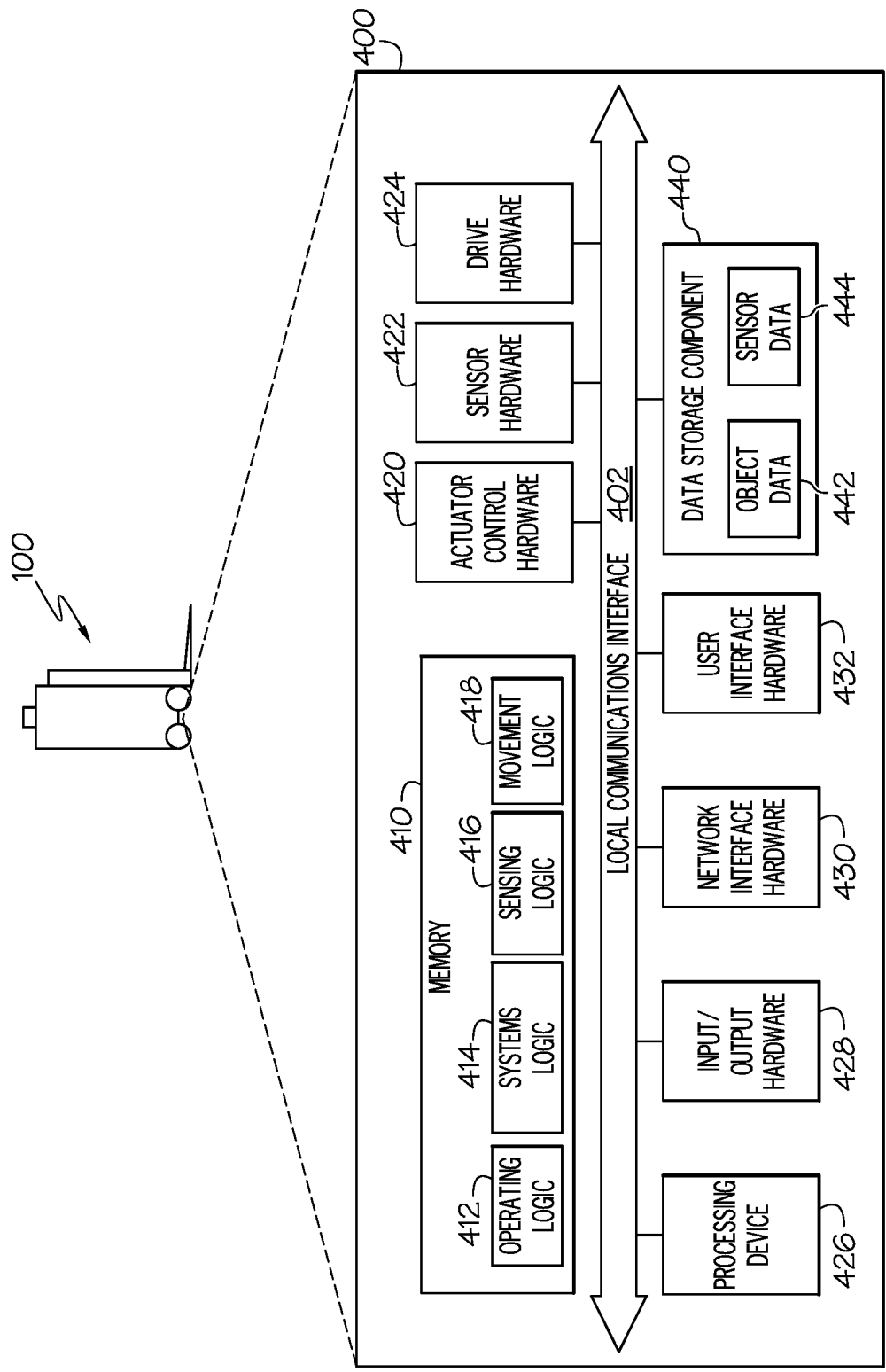
FIG. 4 schematically depicts illustrative hardware components of a lifting robot system according to one or more embodiments shown and described herein.

While FIG. 4 relates particularly to the lifting robot system 100 depicted in FIGS. 1A and 1B, it should be understood that the same or similar components may also be included within the alternative lifting robot system 100' depicted in FIGS. 3A-3B, which includes the first unit 105 and the second unit 130. As illustrated in FIG. 4, the lifting robot system 100 may include a non-transitory memory component 410, actuator control hardware 420, sensor hardware 422, drive hardware 424, a processing device 426, input/output (I/O) hardware 428, network interface hardware 430, user interface hardware 432, and a data storage component 440. A local interface 402, such as a bus or the like, may interconnect the various components.

The processing device 426, such as a computer processing unit (CPU), may be the central processing unit of the lifting robot system 100, performing calculations and logic operations to execute a program. The processing device 426, alone or in conjunction with the other components, is an illustrative processing device, computing device, processor, or combination thereof. The processing device 426 may include any processing component configured to receive and execute instructions (such as from the data storage component 440 and/or the memory component 410).

The memory component 410 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 410 may include one or more programming instructions thereon that, when executed by the processing device 426, cause the processing device 426 to complete various processes, such as the processes described herein with respect to FIGS. 5-8.

Still referring to FIG. 4, the programming instructions stored on the memory component 410 may be embodied as a plurality of software logic modules, where each logic module provides programming instructions for completing one or more tasks. Illustrative logic modules depicted in FIG. 4 include, but are not limited to, operating logic 412, systems logic 414, sensing logic 416, and/or movement logic 418. Each of the logic modules shown in FIG. 4 may be embodied as a computer program, firmware, or hardware, as an example. The operating logic 412 may include an operating system and/or other software for managing components of the lifting robot system 100. The systems logic 414 may generally include logic for operating components of the lifting robot system 100, such as, for example, facilitating communication between various components of the lifting robot system 100 (e.g., communications between the user interface device 160 and the robot device 102 (FIG. 1A)). Still referring to FIG. 4, the sensing logic 416 may include one or more programming instructions for sensing a target object, determining a location of a target object relative to the lifting robot system 100, sensing an indicator provided by a user interface, determining a location of an indicator relative to the lifting robot system 100 and/or a user interface device, and/or the like. The movement logic 418 may include one or more programming instructions for moving the lifting robot system 100 around a space, moving the lifting robot system 100 or a component thereof relative to a target object, moving various components of the lifting robot system 100 (e.g., a collection tray, a lifting pad, a lifting component, and/or the like).

The actuator control hardware 420 generally includes one or more components that control movement of one or more actuators coupled to the lifting robot system 100. For example, the actuator control hardware 420 may control an actuator that directs movement of the collection arm 210 (FIG. 2) and/or a portion thereof by transmitting signals to the actuator to cause the actuator to actuate accordingly, as described in greater detail herein.

Still referring to FIG. 4, the sensor hardware 422 may generally include one or more hardware components that are used in the sensor device 112 (FIG. 1A). Illustrative hardware components include, but are not limited to, a camera (including video and still cameras), an optical sensor, a ranging system, a time-of-flight (TOF) sensor, a proximity sensor, laser emitting devices and/or sensing devices. Other sensors, particularly those used for the purposes of obtaining information that is used for autonomous robotic movement, are contemplated and included within the scope of the present disclosure. In some embodiments, the sensor hardware 422 may receive sensed information and transmit signals and/or data corresponding to the sensed information to one or more components described herein. For example, the sensor hardware 422 may receive images and/or image data via the sensor device 112 (FIG. 1A) and generate one or more signals and/or data to transmit to the processing device 426 for processing the data and determining control of the robot device 102 for maneuvering the robot device 102 (FIG. 1A), as described in greater detail herein.

Still referring to FIG. 4, the sensor hardware 422 may further include hardware components that are used to detect the location or presence of an object. For example, the sensor hardware 422 may include a pressure sensor or the like, such as a pressure sensor coupled to the lifting pad 134 (FIG. 3A) to detect the presence of an object on the lifting pad 134, as described in greater detail herein.

Still referring to FIG. 4, the drive hardware 424 may generally include one or more hardware components that control movement of the robot device 102 (FIG. 1A). For example, the drive hardware 424 may be used to direct a drive mechanism, one or more drive motors, and/or the like to propel the robot device 102 (FIG. 1A) around a space, to direct one or more components (e.g., a drive mechanism) of the first unit to propel the first unit around a space, to direct movement of the lifting component, and/or the like. That is, one or more signals may be transmitted by the drive hardware 424 to a component, thereby causing the component to move or cease moving.

Still referring to FIG. 4, the I/O hardware 428 may communicate information between the local interface 402 and one or more other components of the lifting robot system 100. For example, the I/O hardware 428 may act as an interface between the user interface device 160 (FIG. 1A) and other components of the lifting robot system 100, so as to facilitate communication between the user interface device 160 and the various other components of the lifting robot system 100, as described in greater detail herein. Still referring to FIG. 4, the I/O hardware 428 may be utilized to transmit one or more commands to the other components of the lifting robot system 100 and/or receive one or more commands and/or data from the other components of the lifting robot system 100 in some embodiments.

The network interface hardware 430 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 430 may be used to facilitate communication between smart home components (e.g., sensors, cameras, user interface devices, and/or the like) and the lifting robot system 100 via a network. That is, the lifting robot system 100 may receive commands from a user, receive sensor data, and/or the like from other devices connected to a user's home network, as described in greater detail herein.

The data storage component 440, which may generally be a storage medium, may contain one or more data repositories for storing data that is received and/or generated. The data storage component 440 may be any physical storage medium, including, but not limited to, a hard disk drive (HDD), memory, removable storage, and/or the like. While the data storage component 440 is depicted as a local device, it should be understood that the data storage component 440 may be a remote storage device, such as, for example, a server computing device, cloud based storage device, or the like. Illustrative data that may be contained within the data storage component 440 includes, but is not limited to, object data 442, sensor data 444, and/or other data. The object data 442 may generally be data that is used by the lifting robot system 100 to recognize particular target objects. For example, if a user requests that the lifting robot system 100 lift "keys" the lifting robot system 100 may access the object data 442 to obtain a reference image of a set of keys in order to locate the target object. The object data 442 may be prepopulated data or may be data that is continuously updated with images around a space such that the lifting robot system 100 utilizes a machine learning algorithm to recognize particular characteristics of a target object. The sensor data 444 may generally include data that is obtained from the sensor hardware 422. One nonlimiting example of data contained within the sensor data 444 may include image data relating to an area surrounding the lifting robot system 100, a user, and/or a target object.

It should be understood that the components illustrated in FIG. 4 are merely illustrative and are not intended to limit the scope of this disclosure. More specifically, while the components in FIG. 4 are illustrated as residing within the lifting robot system 100, this is a nonlimiting example. In some embodiments, one or more of the components may reside external to the lifting robot system 100.

Figure 5:
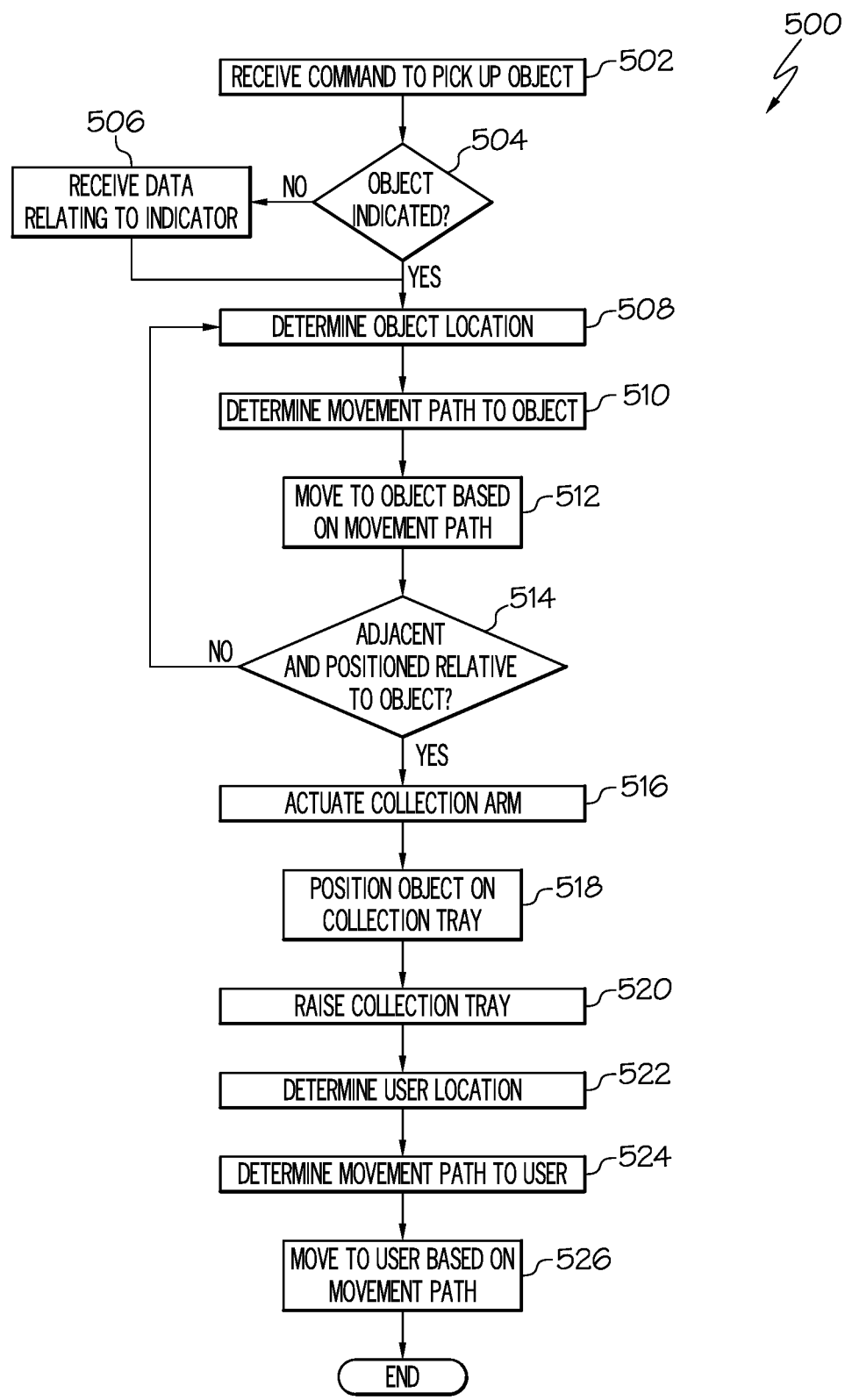
FIG. 5 depicts a flow diagram of an illustrative method of collecting a target object with a lifting robot system according to one or more embodiments shown and described herein.

As mentioned above, the various components described with respect to FIG. 4 may be used to carry out one or more processes and/or provide functionality for moving the robot device 102, for guiding the robot device 102 around a space, for determining an identity and/or a location of a target object, for collecting a target object, for moving a target object, for lifting a target object, and/or for receiving user inputs. An illustrative example of the various processes are described with respect to FIGS. 5-8 hereinbelow. The various processes described with respect to FIGS. 5-8 may generally be completed by the lifting robot system 100 or a component thereof, such as, for example, the processing device 426 (FIG. 4). FIG. 5 depicts an illustrative method of collecting a target object 170, generally designated 500, using the lifting robot system 100 of FIGS. 1A-1B according to some embodiments. The various steps described with respect to FIG. 5 are merely illustrative, and additional, fewer, or alternative steps are contemplated without departing from the scope of the present disclosure.

While also generally referring to FIGS. 1A-1B, 2, and 4, at block 502, a command to pick up a particular target object may be received. The command may be received via the user interface device 160 on the lifting robot system 100, may be received via a third party device that transmits a signal to the lifting robot system 100, and/or the like.

Upon receiving such a command, a determination may be made at block 504 as to whether the target object 170 has been indicated. That is, a determination may be made as to whether the command includes a visual indication of the target object 170 (e.g., a gesture toward the target object 170), a verbal indication (e.g., a voiced input identifying the target object 170) of the target object 170, image data transmitted by the user interface device 160 that contains an image of the target object 170, and/or the like. If the target object 170 is not indicated in the command, the process may proceed to block 506. If the target object 170 is indicated in the command, the process may proceed to block 508.

At block 506, data relating to an indicator may be received. As previously described herein, the indicator may be, for example, a dot projected by the user interface device 160 on or around the target object 170, a shape projected by the user interface device 160 around the target object 170, and/or the like such that the indicator is detectable by a sensor. The detection of the indicator results in data (e.g., image data, coordinate data, and/or the like) that is used for the purposes of locating the target object 170. As described in greater detail herein, in embodiments where a shape is projected by the user interface device 160 around the target object 170 to indicate a size of the target object 170, a determination may be made as to whether the target object 170 is sufficiently shaped and/or sized to be collected and hoisted. If the target object 170 is sufficiently shaped and/or sized, the process may proceed to block 508. If the target object 170 is not sufficiently shaped and/or sized, an error message may be transmitted and/or the process may end.

At block 508, the location of the target object 170 is determined based on the data that is received or the inputs that are received. Such a location is generally determined relative to a location of a known object, such as the location of the user 150, the location of a portion of the lifting robot system 100 (e.g., the location of the robot device 102 or the location of the user interface device 160), and/or the like. In some embodiments, the location may include coordinates of the target object 170. As described in greater detail herein, the location may be determined, for example, by triangulating the location of the user interface device 160, by obtaining location information from an image corresponding to the target object 170, by utilizing sensors (e.g., time-of-flight sensors or the like) to locate the target object 170, by sensing a location of the indicator projected by the user interface device 160, by receiving data voiced or gestured by the user 150 that corresponds to the location (e.g., "by the coffee table," "under the chair," etc.), and/or the like.

The location of the target object 170 is then used to determine a movement path of the robot device 102 (and/or a component thereof) to the target object 170 at block 510. Such a determination may include use of a mapping algorithm or the like that accounts for free space and blockages such that the robot device 102 does not collide with other objects when moving toward the target object 170. In some embodiments, movement may be determined such that the robot device 102 is correctly positioned relative to the target object 170 (i.e., such that the target object 170 can be moved onto the collection tray 118, as described herein). The robot device 102 (and/or a component thereof) may then move according to the determined movement path at block 512.

It should be understood that the processes according to blocks 508, 510, and 512 may occur continuously until the robot device 102 (and/or a component thereof) is located adjacent to the target object 170 and is positioned relative to the target object 170 for the purposes of collecting the target object 170. As such, at block 514, a determination may be made as to whether the robot device 102 is adjacent to and correctly positioned relative to the target object 170. Such a determination may generally include obtaining data (e.g., image data and/or the like) and determining the location and positioning of the robot device 102 relative to the target object 170. If the robot device 102 is not adjacent to and/or not correctly positioned relative to the target object 170, the process may return to block 508. If the robot device 102 is adjacent to and correctly positioned relative to the target object 170, the process may proceed to block 516.

At block 516, the collection arm 210 may be actuated. Actuation of the collection arm 210 may include, for example, transmitting an actuation signal from the actuator control hardware 420 to an actuator coupled to the collection arm 210 to activate the collection arm 210 such that the collection arm 210 moves to sweep or otherwise place the target object 170 onto the collection tray 118. As a result, the target object 170 may be positioned on the collection tray 118 at block 518.

Once the target object 170 has been positioned on the collection tray 118, the collection tray 118 may be raised at block 520. For example, a signal may be transmitted from the actuator control hardware 420 and/or the drive hardware 424 to cause the lifting component 116 to raise the collection tray 118 (e.g., move the collection tray 118 in the +y direction of the coordinate axes of FIG. 1A). The collection tray 118 may generally be lifted to a height that is accessible to the user 150, as described in greater detail herein.

Still referring to FIGS. 1A-1B, 2, and 4, the user 150 may not be located at or near the robot device 102 in some embodiments. In addition, the user 150 may not be able to move to the location of the robot device 102. As such, a location of the user 150 relative to the robot device 102 may be determined at block 522. Such a determination may include determining based on the data that is received or the inputs that are received. In some embodiments, the location may include coordinates of the user 150. The location of the user 150 is then used to determine a movement path of the robot device 102 (and/or a component thereof) to the user 150 at block 524. Such a determination may include use of a mapping algorithm or the like that accounts for free space and blockages such that the robot device 102 does not collide with other objects when moving toward the user 150. In some embodiments, movement may be determined such that the lifting robot system 100 is correctly positioned relative to the user 150 (i.e., such that the user 150 can access the collection tray 118 and the target object 170 supported thereon, as described herein). The robot device 102 (and/or a component thereof) may then move according to the determined movement path at block 526.

It should be understood that the processes according to blocks 522, 524, and 526 may occur continuously until the robot device 102 (and/or a component thereof) is located adjacent to the user 150 and is positioned relative to the user 150 for the purposes of providing the target object 170 to the user 150.

Figure 6:
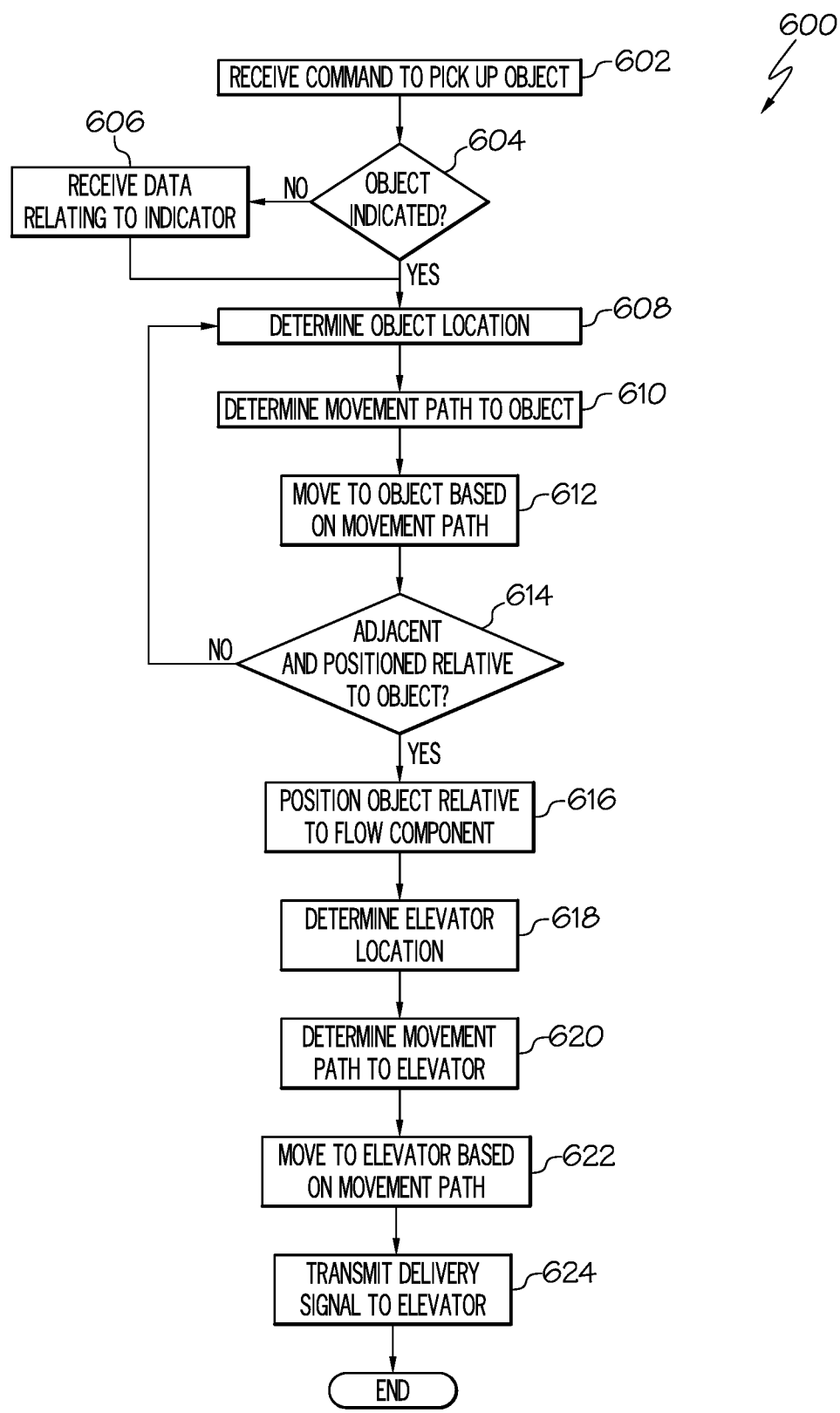
FIG. 6 depicts a flow diagram of another illustrative method of collecting a target object with a lifting robot system according to one or more embodiments shown and described herein.

FIG. 6 depicts an illustrative method of collecting a target object 170, generally designated 600, using the lifting robot system 100' of FIGS. 3A-3B according to some embodiments. The various steps described with respect to FIG. 6 are merely illustrative, and additional, fewer, or alternative steps are contemplated without departing from the scope of the present disclosure.

While also generally referring to FIGS. 3A-3B and 4, at block 602, a command to pick up a particular target object may be received. The command may be received via the user interface device 160 of the lifting robot system 100', may be received via a third party device that transmits a signal to the lifting robot system 100', and/or the like.

Upon receiving such a command, a determination may be made at block 604 as to whether the target object 170 has been indicated. That is, a determination may be made as to whether the command includes a visual indication of the target object 170 (e.g., a gesture toward the target object 170), a verbal indication (e.g., a voiced input identifying the target object 170) of the target object 170, image data transmitted by the user interface device 160 that contains an image of the target object 170, and/or the like. If the target object 170 is not indicated in the command, the process may proceed to block 606. If the target object 170 is indicated in the command, the process may proceed to block 608.

At block 606, data relating to an indicator may be received. As previously described herein, the indicator may be, for example, a dot projected by the user interface device 160 on or around the target object 170, a shape projected by the user interface device 160 around the target object 170, and/or the like such that the indicator is detectable by a sensor. The detection of the indicator results in data (e.g., image data, coordinate data, and/or the like) that is used for the purposes of locating the target object 170. As described in greater detail herein, in embodiments where a shape is projected by the user interface device 160 around the target object 170 to indicate a size of the target object 170, a determination may be made as to whether the target object 170 is sufficiently shaped and/or sized to be collected and hoisted. If the target object 170 is sufficiently shaped and/or sized, the process may proceed to block 608. If the target object 170 is not sufficiently shaped and/or sized, an error message may be transmitted and/or the process may end.

At block 608, the location of the target object 170 is determined based on the data that is received or the inputs that are received. Such a location is generally determined relative to a location of a known object, such as the location of the user 150, the location of the first unit 105 of lifting robot system 100', the location of the second unit 130 of the lifting robot system 100', the location of the user interface device 160, and/or the like. In some embodiments, the location may include coordinates of the target object 170. As described in greater detail herein, the location may be determined, for example, by triangulating the location of the user interface device 160, by obtaining location information from an image corresponding to the target object 170, by utilizing sensors (e.g., time-of-flight sensors or the like) to locate the target object 170, by sensing a location of the indicator projected by the user interface device 160, by receiving data voiced or gestured by the user 150 that corresponds to the location (e.g., "by the coffee table," "under the chair," etc.), and/or the like.

The location of the target object 170 is then used to determine a movement path of the first unit 105 (and/or a component thereof) to the target object 170 at block 610. Such a determination may include use of a mapping algorithm or the like that accounts for free space and blockages such that the first unit 105 does not collide with other objects when moving toward the target object 170. In some embodiments, movement may be determined such that the first unit 105 is correctly positioned relative to the target object 170 (i.e., such that the target object 170 can be pushed by the plow component 120, as described herein). The first unit 105 (and/or a component thereof) may then move according to the determined movement path at block 612.

It should be understood that the processes according to blocks 608, 610, and 612 may occur continuously until the first unit 105 of the lifting robot system 100' (and/or a component thereof) is located adjacent to the target object 170 and is positioned relative to the target object 170 for the purposes of pushing or otherwise manipulating the target object 170. As such, at block 614, a determination may be made as to whether the first unit 105 is adjacent to and correctly positioned relative to the target object 170. Such a determination may generally include obtaining data (e.g., image data and/or the like) and determining the location and positioning of the first unit 105 relative to the target object 170. If the first unit 105 is not adjacent to and/or not correctly positioned relative to the target object 170, the process may return to block 608. If the first unit 105 is adjacent to and correctly positioned relative to the target object 170, the process may proceed to block 616.

At block 616, the target object 170 may be positioned relative to the plow component 120. For example, the first unit 105 may move or orient itself such that the target object 170 is located within the recess 122 such that the body 121 of the plow component 120 can push the target object 170.

Once the target object 170 has been positioned relative to the plow component 120, a location of the second unit 130 (e.g., the elevator) relative to the first unit 105 may be determined at block 618. Such a determination may include determining based on the data that is received or the inputs that are received. In some embodiments, the location may include coordinates of the second unit 130. The location of the second unit 130 (e.g., the elevator) is then used to determine a movement path of the first unit 105 (and/or a component thereof) to the second unit 130 at block 620. Such a determination may include use of a mapping algorithm or the like that accounts for free space and blockages such that the first unit 105 does not collide with other objects when moving toward the second unit 130. In some embodiments, movement may be determined such that the first unit 105 is correctly positioned relative to the second unit 130 (i.e., such that the target object 170 is pushed by the first unit 105 onto the lifting pad 134 of the second unit 130, as described herein). The first unit 105 (and/or a component thereof) may then move according to the determined movement path at block 622.

It should be understood that the processes according to blocks 618, 620, and 622 may occur continuously until the first unit 105 (and/or a component thereof) is located adjacent to the second unit 130 and is positioned relative to the second unit 130 for the purposes of pushing the target object 170 onto the lifting pad 134.

Once the first unit 105 has moved to push the target object 170 onto the lifting pad 134 of the second unit 130, a signal may be transmitted to the second unit 130 at block 624. The signal may generally indicate that the target object 170 is located on the lifting pad 134 and is ready to be lifted. Lifting the target object 170 may be completed as described herein with respect to FIG. 7.

Figure 7:
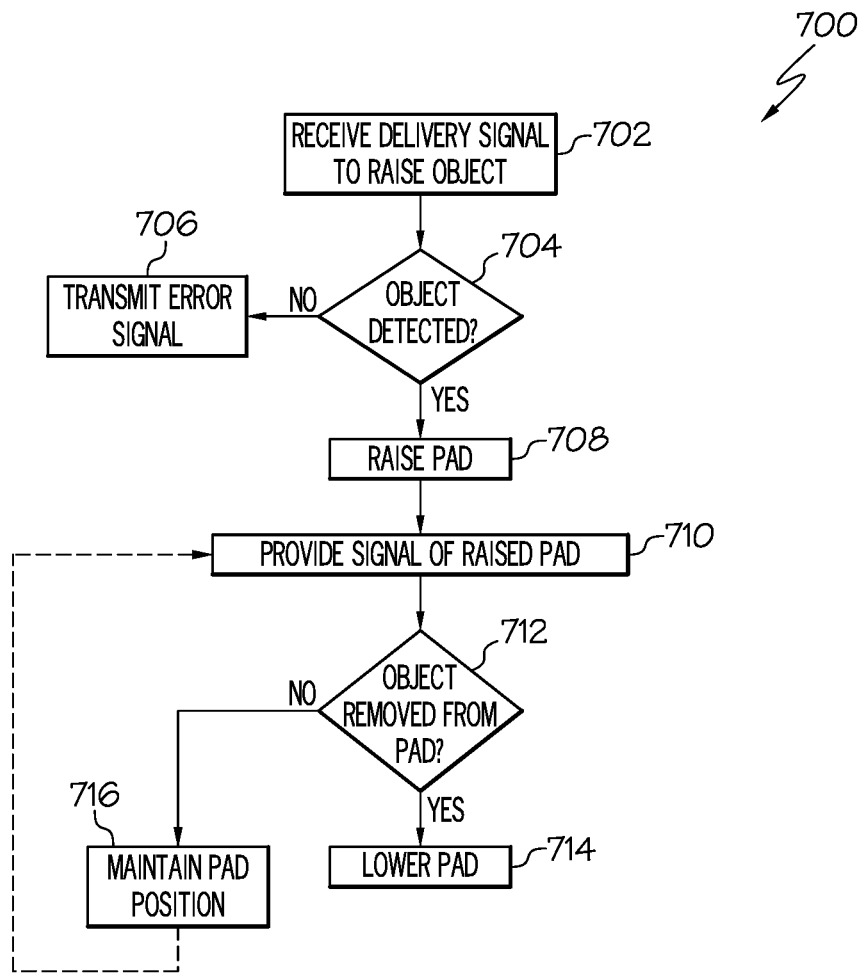
FIG. 7 depicts a flow diagram of an illustrative method employed by an elevator portion of a lifting robot system to lift a target object according to one or more embodiments shown and described herein.

FIG. 7 depicts an illustrative method of lifting a target object 170, generally designated 700, using the lifting robot system 100' of FIGS. 3A-3B according to some embodiments. Referring now to FIGS. 3A-3B, 4, and 7, the second unit 130 may receive the signal from the first unit 105 indicating that the target object 170 is located on the lifting pad 134 and is ready to be lifted at block 702. At block 704, a determination may be made as to whether the target object 170 has been detected on the lifting pad 134. For example, data may be transmitted by the lifting pad 134 or a component coupled thereto (e.g., a pressure sensor or the like) that indicates whether the target object 170 has been detected. For example, if the lifting pad 134 has a pressure sensor coupled thereto, the pressure sensor may transmit data if the amount of pressure applied to the pressure sensor is indicative of an object placed thereon (e.g., the weight of the target object 170 causes the target object 170 to press down on the pressure sensor, which transmits a signal in response). If no object is detected, the process may proceed to block 706. If an object is detected, the process may proceed to block 708.

At block 706, an error signal may be transmitted. Such an error signal may generally be indicative that no object was received on the lifting pad 134 such that the first unit 105 of the lifting robot system 100' can carry out one or more processes to move the target object 170 as needed. As such, the error signal may be transmitted to the first unit 105 in some embodiments.

At block 708, the lifting pad 134 may be raised. That is, the lifting component 132 may be actuated to raise the lifting pad 134 to a particular height, such as a height that is accessible to the user 150, as described in greater detail herein. A signal indicating that the lifting pad 134 has been lifted may then be provided at block 710. Such a signal is not limited by this disclosure, and may generally be any signal. For example, the signal may be transmitted to provide an indication to the user 150 (FIG. 1A) that the lifting pad 134 has been raised, such as via the user interface device 160. In another example, the signal may be transmitted to the first unit 105 of the lifting robot system 100' such that the first unit 105 moves away from the second unit 130 so the second unit 130 is accessible to a user 150.

Still referring to FIGS. 3A-3B, 4, and 7, a determination may be made as to whether the target object 170 has been removed from the raised lifting pad 134. For example, data may be transmitted by the lifting pad 134 or a component coupled thereto (e.g., a pressure sensor or the like) that indicates whether the target object 170 has been removed from the lifting pad 134. For example, if the lifting pad 134 has a pressure sensor coupled thereto, the pressure sensor may transmit data if the amount of pressure applied to the pressure sensor is indicative of an object being removed therefrom (e.g., the weight of the target object 170 on the pressure sensor is reduced, which transmits a signal in response). If the target object 170 is detected as being removed from the lifting pad 134, the lifting pad 134 may be lowered to receive additional objects at block 714. If the target object 170 is detected as not being removed (i.e., still present on the lifting pad 134), the pad position at the particular height may be maintained at block 716 until the target object 170 is removed. As such, in some embodiments, the process may return to block 710 to notify the user 150 again.

Figure 8:
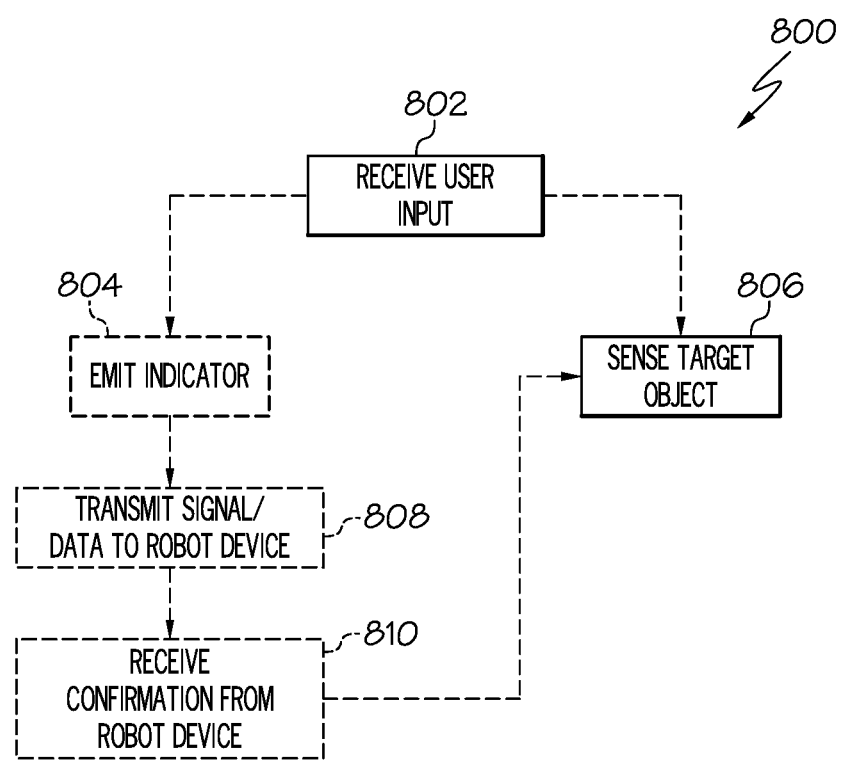
FIG. 8 depicts a flow diagram of an illustrative method of identifying the location of a target object by a lifting robot system according to one or more embodiments shown and described herein.

FIG. 8 is a flow diagram of an illustrative method of identifying a location of the target object 170, generally designated 800. Referring now to FIGS. 1A-1B, 4, and 8, the method 800 includes receiving a user input at block 802. The user input may generally be received at the user interface device 160 in the form of a button press, a voiced command, a movement of the user interface device 160 in a particular way such that the gyro sensors or the like within the user interface device 160 detect the particular movement, and/or the like. However, it should be understood that the user input may be received via other means, such as, but not limited to, receiving data from a third party device, where the data corresponds to the user input or utilizing the sensor device 112 to detect a user gesture, voiced input, and/or the like and determining the user input therefrom.

The type of user input received at block 802 dictates the next step in the method 800 of FIG. 8. That is, if the user input received at block 802 corresponds to an indication that the user 150 is utilizing the user interface device 160 to project an indicator onto the target object 170 (e.g., the user 150 is pushing a button that activates a laser emitting device), the process may proceed to block 804, whereby the indicator is emitted. However, if the user input received at block 802 corresponds to another indication of the target object 170 and/or the location of the target object 170 (e.g., the user 150 voices "pick up the keys near the sofa" and/or makes a hand gesture towards the target object 170, data is received from a third party device indicating a command, etc.), the process may proceed to block 806, whereby the target object 170 is sensed based on the data that was provided.

If the indicator is emitted at the target object 170 at block 804, the user interface device 160 may transmit a signal and/or data to the robot device 102 at block 808. Such a signal and/or data corresponds to an indication that the indicator is being projected by the user interface device 160. For example, the user interface device 160 may automatically transmit a signal whenever the user 150 presses a button that causes the user interface device to project the indicator (e.g., the user 150 presses a button that activates a laser projector). In another example, the user interface device 160 may transmit data corresponding to detected location coordinates of the target object 170 and/or location coordinates of the user interface device 160 to facilitate detection of the target object 170.

In some embodiments, the robot device 102 may transmit a confirmation to the user interface device 160, which is received by the user interface device 160 at block 810. The confirmation may be a signal and/or data that confirms that the robot device 102 received the signal and/or data from the user interface device 160. The process may return to block 806 for sensing the target object 170, as described herein.

It should now be understood that the robot systems described herein are configured to autonomously detect and lift objects from a relatively lower height (e.g., ground or floor level) to a relatively higher height (e.g., a height that is more easily reachable by a user) upon receiving a command from the user. The robot systems described herein generally include various components that receive inputs and/or data, sense a surrounding area, autonomously move and locate objects, collect objects, and raise objects. As a result, the robot systems described herein may be particularly useful for elderly users and/or users with reduced mobility, such as users that are unable to easily stoop, crouch, or bend over to pick up an object, users that have arthritis or another condition that makes it difficult to use gripping devices, and/or users that cannot move around a space, such as bedridden users.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lifting robot system, comprising:
a sensor device; and
a robot device comprising:
   a body,
   a lifting component movably coupled to the body, and
   a collection tray coupled to the lifting component, the collection tray comprising a tray body with a collection arm hingedly coupled to the tray body, the collection arm rotatable towards or away from the tray body,
   wherein, upon receiving a command to lift an object:
      the sensor device automatically detects the object,
      the robot device places the object on the collection tray, and
      the robot device causes the lifting component to lift the collection tray from a first height to a second height.

2. The lifting robot system of claim 1, further comprising a user interface device communicatively coupled to the robot device.

3. The lifting robot system of claim 2, wherein the user interface device comprises a light emitting component that emits an indicator on or around the object when the user interface device is aimed by a user at the object.

4. The lifting robot system of claim 2, wherein the user interface device comprises one or more user input components selected from a button, a microphone, a motion sensor, and an imaging device.

5. The lifting robot system of claim 1, wherein receiving the command to lift the object comprises:
   receiving one or more of a voiced command and a gesture from a user, and
   determining a location of the object based on the one or more of the voiced command and the gesture.

6. The lifting robot system of claim 1, wherein the robot device further comprises a base supporting the body, the base comprising one or more mobility components.

7. The lifting robot system of claim 6, wherein:
   the one or more mobility components comprise one or more wheels coupled to a drive mechanism that drives movement of the one or more wheels; and
   the robot device further comprises a processing device communicatively coupled to the sensor device and the drive mechanism.

8. The lifting robot system of claim 7, wherein:
   data is transmitted from the sensor device to the processing device,
   the processing device processes the data and determines one or more movement commands, and
   the processing device transmits one or more signals corresponding to the one or more movement commands to the drive mechanism to cause the one or more wheels to move such that the lifting robot system operates autonomously or semi-autonomously.

9. The lifting robot system of claim 1, wherein the robot device places the object on the collection tray by directing an actuator to rotate the collection arm towards the collection tray to push the object onto the collection tray.

10. The lifting robot system of claim 1, wherein:
    the first height corresponds to a floor level or ground level; and
    the second height corresponds to a height that is above the floor level or ground level.

11. A lifting robot system, comprising:
    a mobile first unit comprising:
       a movable body,
       a base supporting the body, the base comprising one or more mobility components, and
       a plow component coupled to the body such that the plow component contacts a ground surface; and
    a standing second unit separate from the first unit, the second unit comprising:
       a lifting pad, and
       a lifting component coupled to the lifting pad, the lifting component movable to lift the lifting pad from the ground surface to a height.

12. The lifting robot system of claim 11, further comprising a user interface device communicatively coupled to the first unit.

13. The lifting robot system of claim 12, wherein the user interface device comprises a light emitting component that emits an indicator on or around an object when the user interface device is aimed by a user at the object.

14. The lifting robot system of claim 12, wherein the user interface device comprises one or more user input components selected from a button, a microphone, a motion sensor, and an imaging device.

15. The lifting robot system of claim 11, wherein:
the one or more mobility components comprise one or more wheels coupled to a drive mechanism that drives movement of the one or more wheels; and
the first unit further comprises:
a sensor device, and
a processing device communicatively coupled to the sensor device and the drive mechanism.

16. The lifting robot system of claim 15, wherein:
data is transmitted from the sensor device to the processing device,
the processing device processes the data and determines one or more movement commands, and
the processing device transmits one or more signals corresponding to the one or more movement commands to the drive mechanism to cause the one or more wheels to move such that the lifting robot system operates autonomously or semi-autonomously.

17. The lifting robot system of claim 11, wherein, upon receiving a command to lift an object:
the first unit automatically detects the object, moves to the object, causes the plow component to contact the object, and pushes the object, via the plow component, to the lifting pad such that the object is placed on the lifting pad, and
the second unit detects the object on the lifting pad and actuates the lifting component to lift the lifting pad and the object to the height.

18. A lifting robot system, comprising:
a sensor device;
a user interface device; and
a robot device comprising:
a body,
a lifting component movably coupled to the body,
a collection tray coupled to the lifting component,
a processing device communicatively coupled to the sensor device, the user interface device, and the lifting component, and
a non-transitory, processor-readable storage medium communicatively coupled to the processing device, the non-transitory, processor-readable storage medium comprising one or more programming instructions that, when executed, cause the processing device to:
receive a signal or data from the user interface device, the signal or the data corresponding to a request from a user to retrieve an object,
receive sensor data from the sensor device, wherein the sensor data corresponds to a sensed environment around the lifting robot system and comprises the object and an indicator indicating the object,
determine a location of the object,
direct movement of the robot device to the object such that the object is placed on the collection tray, and
cause the lifting component to raise the collection tray and the object.

19. The lifting robot system of claim 18, wherein the user interface device comprises a light emitting component that emits the indicator on or around the object when the user interface device is aimed by the user at the object.

20. The lifting robot system of claim 18, wherein the user interface device comprises one or more user input components selected from a button, a microphone, a motion sensor, and an imaging device.

* * * * *

UNITED STATES PATENT AND TRADEMARK OFFICE
CERTIFICATE OF CORRECTION

PATENT NO. : 11,020,858 B2  
APPLICATION NO. : 16/109895  
DATED : June 1, 2021  
INVENTOR(S) : Matthew Amacker et al.

It is certified that error appears in the above-identified patent and that said Letters Patent is hereby corrected as shown below:

On the Title Page

Item (73), assignee 1, delete "TOYOTA RESEARCHING INSTITUTE, INC." and insert --TOYOTA RESEARCH INSTITUTE, INC.--, therefor.

In the Specification

In Column 7, Line(s) 61, delete "Ski®" and insert --Siri®--, therefor.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*